(12) United States Patent
Ohr et al.

(10) Patent No.: US 9,791,000 B2
(45) Date of Patent: Oct. 17, 2017

(54) WEDGE CLUTCH WITH OPPOSING THRUST FORCES

(71) Applicant: Schaeffler Technologies AG & Co. KG, Herzogenaurach (DE)

(72) Inventors: Carsten Ohr, Charlotte, NC (US); Brian Lee, York, SC (US); Marion Jack Ince, Mount Holly, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/181,581

(22) Filed: Jun. 14, 2016

(65) Prior Publication Data

US 2017/0219025 A1    Aug. 3, 2017

Related U.S. Application Data

(63) Continuation-in-part of application No. 15/011,850, filed on Feb. 1, 2016.

(51) Int. Cl.
| | |
|---|---|
| *F16D 13/14* | (2006.01) |
| *F16D 15/00* | (2006.01) |
| *F16D 13/24* | (2006.01) |
| *F16D 41/061* | (2006.01) |
| *F16D 13/18* | (2006.01) |
| *F16D 23/12* | (2006.01) |

(52) U.S. Cl.
CPC ............ *F16D 41/061* (2013.01); *F16D 13/18* (2013.01); *F16D 15/00* (2013.01); *F16D 2023/123* (2013.01)

(58) Field of Classification Search
CPC ........................................................ F16D 13/14
USPC ................................................ 192/93 C, 65
See application file for complete search history.

(56) References Cited

U.S. PATENT DOCUMENTS

| | | | | |
|---|---|---|---|---|
| 1,115,928 | A * | 11/1914 | Hansen ................... | F16D 13/12 192/107 R |
| 2,561,955 | A * | 7/1951 | Spase ...................... | F16D 13/12 192/65 |
| 2,883,024 | A * | 4/1959 | Emrick ................... | F16D 15/00 192/45.1 |
| 7,779,979 | B2 * | 8/2010 | Youk ....................... | F16D 23/04 192/65 |
| 2014/0110207 | A1 * | 4/2014 | Davis ...................... | F16D 41/08 192/45.1 |
| 2014/0332335 | A1 * | 11/2014 | Strong .................... | F16D 41/06 192/43 |

(Continued)

*Primary Examiner* — Mark Manley

(57) ABSTRACT

A wedge clutch, including: first and second hubs; an outer ring; a first wedge plate radially disposed between the first hub and the outer ring; a second wedge plate radially disposed between the second hub and the outer ring; and a wedge pin including an actuation ramp axially disposed between the first and second hubs. To transition to a connect mode, in which the first and second hubs are non-rotatably connected to the outer ring, the wedge pin is arranged to rotate in a first rotational direction and the actuation ramp is arranged to displace the first and second hubs away from each other. To transition to a disconnect mode, in which the first and second hubs are rotatable with respect to the outer ring, the wedge pin is arranged to rotate in a second opposite rotational direction to reduce an axial distance between the first and second hubs.

20 Claims, 15 Drawing Sheets

(56) References Cited

U.S. PATENT DOCUMENTS

2015/0083539 A1    3/2015    Lee et al.

* cited by examiner

WEDGE CLUTCH WITH OPPOSING THRUST FORCES

CROSS-REFERENCE TO RELATED APPLICATIONS

This application is a continuation-in-part patent application under 35 U.S.C. 120 of application Ser. No. 15/011,850, filed on Feb. 1, 2016, which application is incorporated herein by reference.

TECHNICAL FIELD

Described herein is a wedge clutch with two cone-shaped hubs and tow wedge plates. The taper of the hubs results in thrust forces which cancel each other out during a connect (closed) mode for the clutch. Cancellation of the thrust forces eliminates undesirable axial shifting of the hubs during the connect mode.

BACKGROUND

FIG. 15 is a partial cross-sectional view of prior art wedge clutch 200. Clutch 200 includes axis of rotation AR, hub 202, wedge plate 204, and outer ring 206. Actuation force AF is applied in axial direction AD1 to close clutch 200 (connect mode). Wedge clutch 200 exhibits a tendency to disconnect during the connect mode caused by an axial movement of the hub as follows. Taper angle 208 between wedge plate 204 and hub 202 causes thrust force TF in direction AD2, opposite direction AD1. For increasing torque, hub 202 is held approximately in a same axial position due to frictional contact at the connection, for example a spline, between hub 202 and a shaft (not shown). When the relative rotation direction between hub 202 and outer ring 206 changes, torque immediately disappears, while contact forces are still present in the system. As a result, thrust force TF created at the taper between hub 202 and wedge plate 204 pushes hub in axial direction AD2 until thrust force TF is smaller than actuation force AF. At that point, actuation force AF pushes hub 202 back to the original and desired axial location.

The displacement of hub 202 in direction AD2 during the connect mode weakens the connection between wedge plate 204 and hub 202, which can lead to loss of the non-rotatable connection between plate 204 and hub 202 and ring 206 and subsequent opening of clutch 200. Also, if force TF pushes hub 202 far enough in direction AD2, hub 202 can extend partly or wholly past wedge plate 204 in direction AD2, either compromising or disabling the functioning of clutch 200. Further, if only partial cycles of torque application are experienced by clutch 200, that is, if clutch 200 is not fully displaced back in direction AD1 by each partial cycle, each successive cycle displaces hub 202 further in direction AD2 for the beginning of the next cycle. As a result, the successive partial cycles can "walk" hub 202 partially or wholly past wedge plate 204 in direction AD2.

SUMMARY

According to aspects illustrated herein, there is provided a wedge clutch, including: a first hub; a second hub; an outer ring located radially outward of the first and second hubs; a first wedge plate radially disposed between the first hub and the outer ring; a second wedge plate radially disposed between the second hub and the outer ring; and a wedge pin including an actuation ramp axially disposed between the first and second hubs. To transition to a connect mode, in which the first and second hubs are non-rotatably connected to the outer ring the wedge pin is arranged to rotate in a first rotational direction about an axis of rotation for the wedge pin and the actuation ramp is arranged to displace the first and second hubs away from each other. To transition to a disconnect mode, in which the first and second hubs are rotatable with respect to the outer ring, the wedge pin is arranged to rotate in a second rotational direction, opposite the first rotational direction to reduce an axial distance between the first and second hubs.

According to aspects illustrated herein, there is provided a wedge clutch, including: a first hub; a second hub; an outer ring located radially outward of the first and second hubs; a first wedge plate radially disposed between the first hub and the outer ring; a second wedge plate radially disposed between the second hub and the outer ring; and a wedge pin including a shaft and an actuation ramp non-rotatably connected to the shaft. The actuation ramp includes: using the axis of rotation for the wedge pin as a reference, a radially outer surface; a first surface connecting the radially outer surface and the shaft; and a second surface connecting the radially outer surface and the shaft. To transition to a connect mode, in which the first and second hubs are non-rotatably connected to the outer ring the wedge pin is arranged to rotate in a first rotational direction about the axis of rotation for the wedge pin and the first and second surfaces are arranged to displace the first and second hubs axially away from each other. To transition to a disconnect mode, in which the first and second hubs are rotatable with respect to the outer ring, the wedge pin is arranged to rotate in a second rotational direction, opposite the first rotational direction, to reduce an axial space between the first and second hubs.

According to aspects illustrated herein, there is provided a wedge clutch, including: a first hub including a first cavity and a first surface disposed at least partially in a radial direction orthogonal to an axis of rotation for the wedge clutch; a second hub including a second cavity and a second surface disposed at least partially in the radial direction; an outer ring located radially outward of the first and second hubs; a first wedge plate radially disposed between the first hub and the outer ring; a second wedge plate radially disposed between the second hub and the outer ring; and a wedge pin including a shaft and an actuation ramp non-rotatably connected to the shaft. The actuation ramp includes: a portion disposed in the first and second cavities; a first circumferential end having a first extent in an axial direction parallel to an axis of rotation for the wedge pin; a second circumferential end having a second extent in the axial direction less than the first extent; using the axis of rotation for the wedge key as a reference axis, a radially outer surface; a third surface connecting the first and second circumferential ends; and a fourth surface connecting the first and second circumferential ends. To transition to a connect mode, in which the first and second hubs are non-rotatably connected to the outer ring the wedge pin is arranged to rotate in a first rotational direction about the axis of rotation for the wedge pin and the first and second surfaces are arranged to displace the first and second hubs axially away from each other. In the connect mode, the second circumferential end is radially between the axis of rotation for the wedge pin and an axis of rotation for the wedge clutch. To transition to a disconnect mode, in which the first and second hubs are rotatable with respect to the outer ring, the wedge pin is arranged to rotate in a second rotational direction, opposite the first rotational direction. In the disconnect mode, the first circumferential end is radially between the axis of rotation for the wedge pin and the axis of rotation for the wedge clutch.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
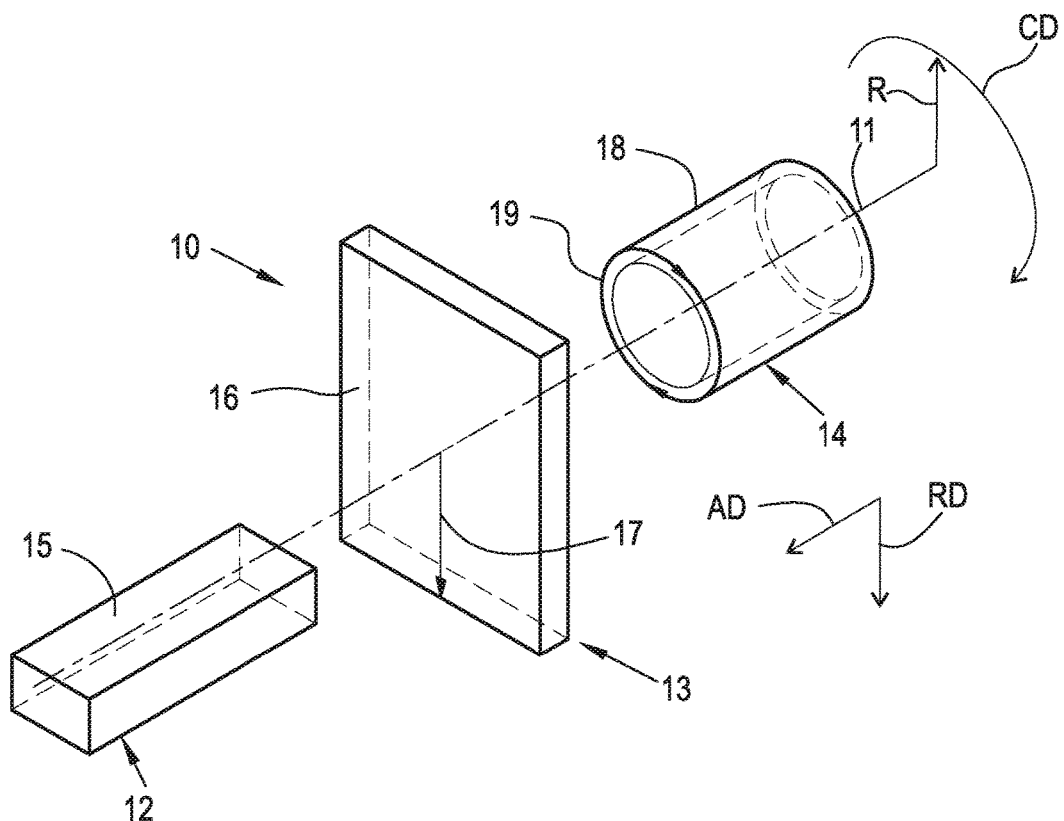
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
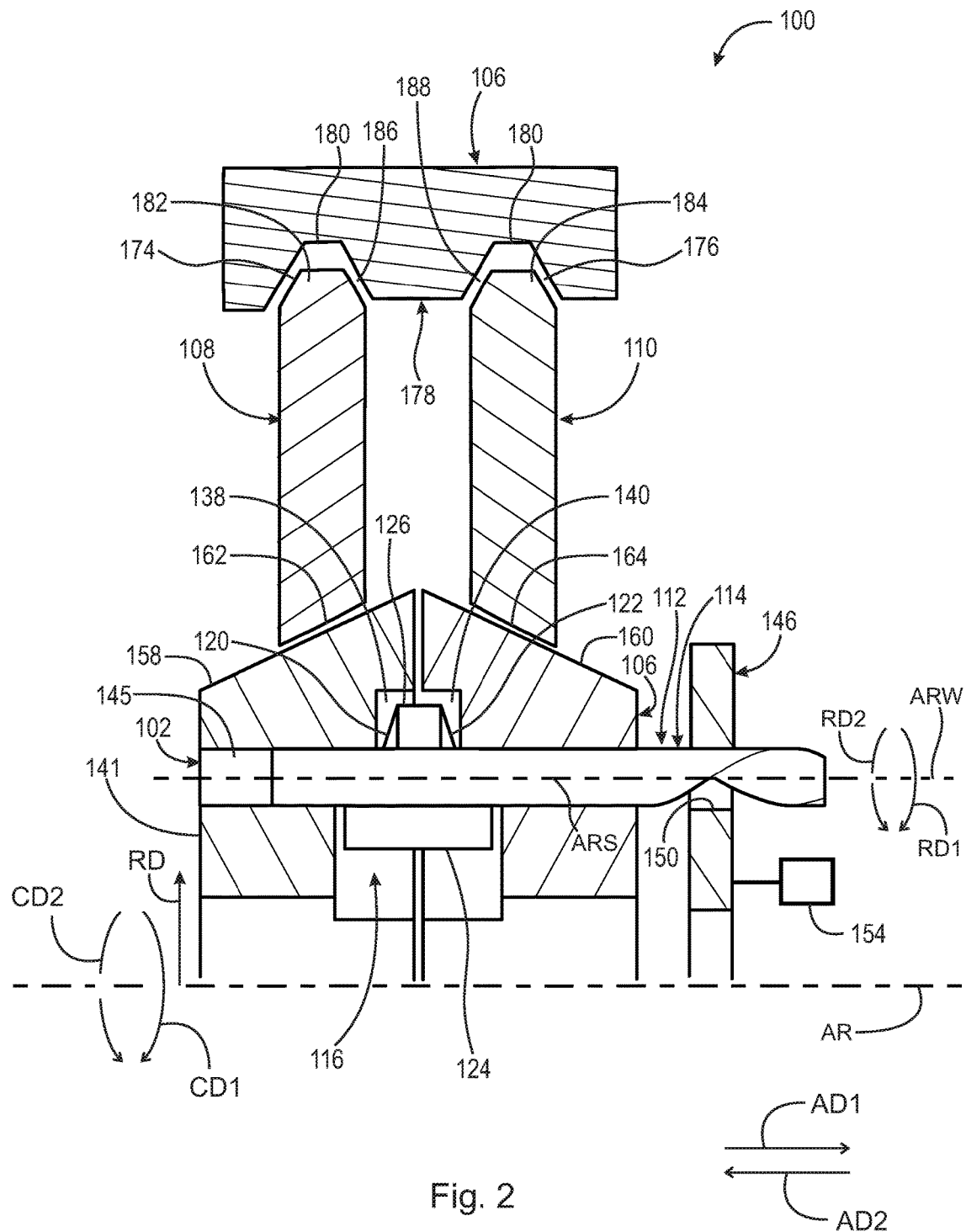
FIG. 2 is a partial cross-sectional view of a wedge clutch with axially displaceable hubs in a disconnect mode.

FIG. 2 is a partial cross-sectional view of wedge clutch 100 with axially displaceable hubs in a disconnect mode.

Figure 3:
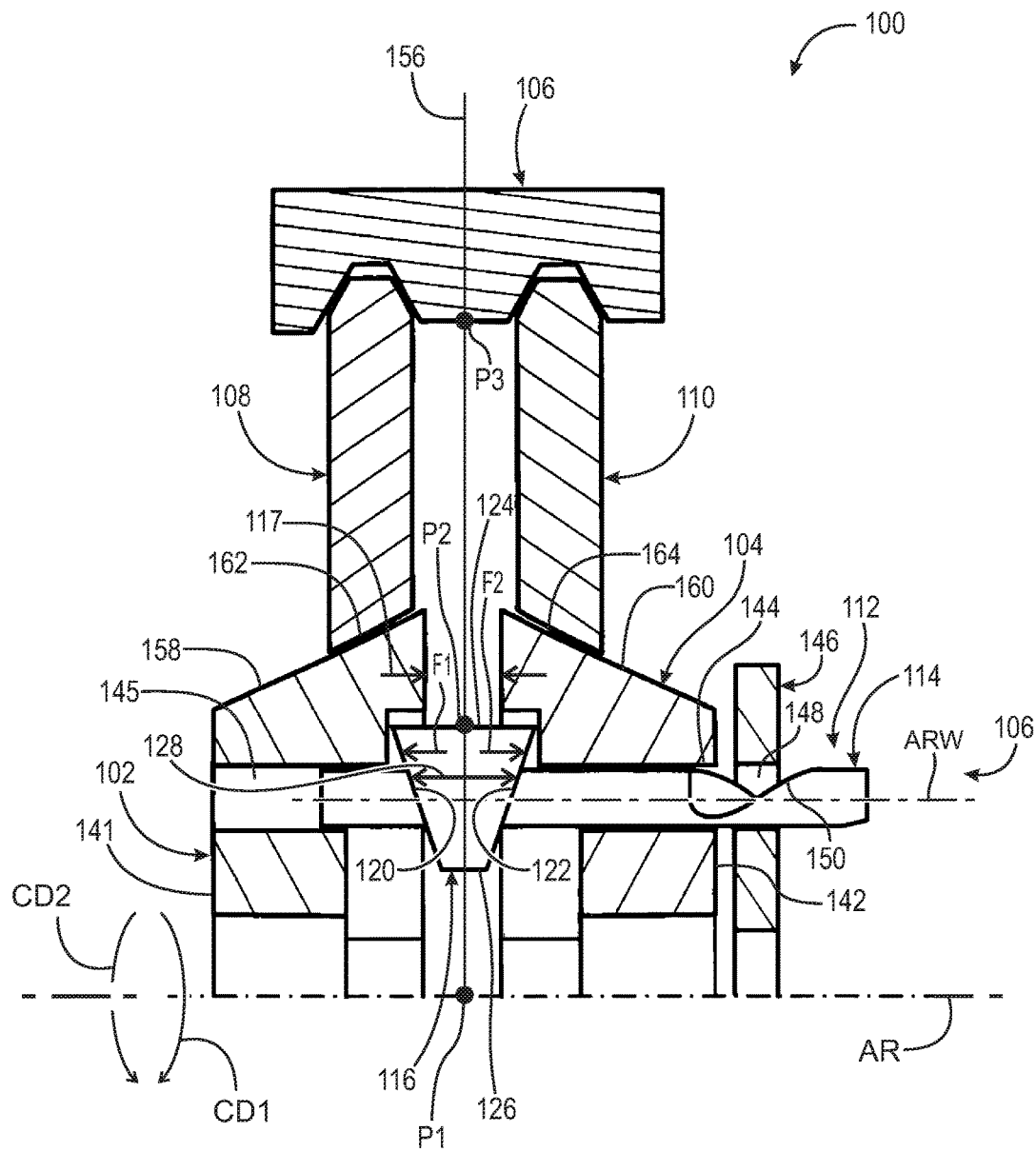
FIG. 3 is a partial cross-sectional view of the wedge clutch shown in FIG. 2 in a connect mode.

FIG. 3 is a partial cross-sectional view of wedge clutch 100 shown in FIG. 2 in a connect mode.

Figure 4:
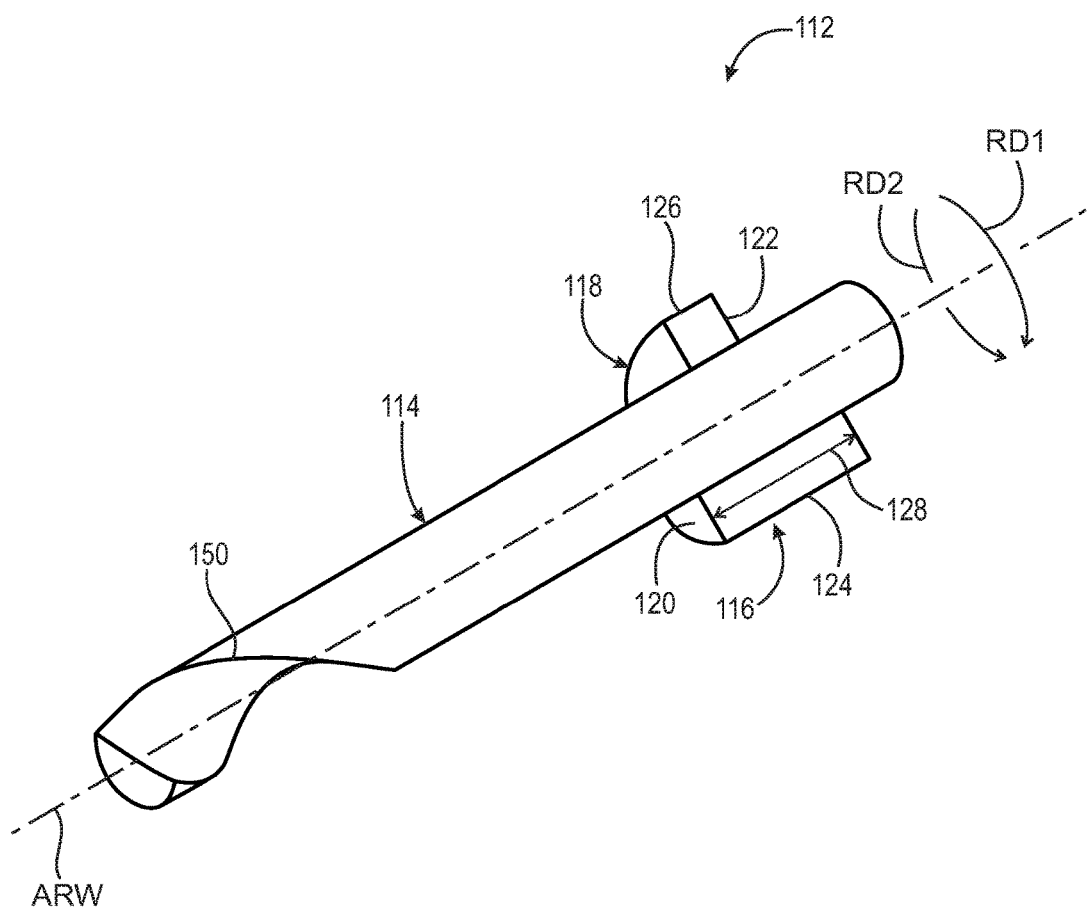
FIG. 4 is a perspective view of the wedge pin shown in FIG. 2.

FIG. 4 is a perspective view of the wedge pin shown in FIG. 2.

Figure 5:
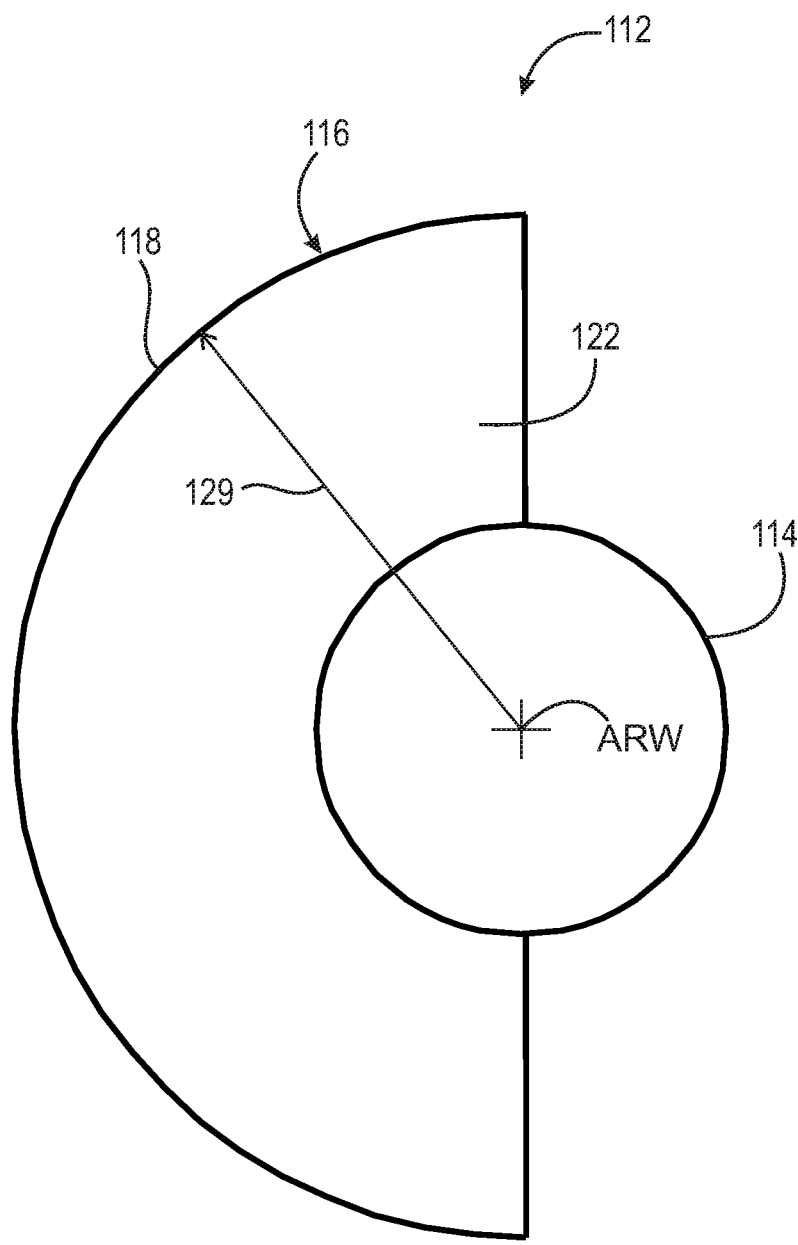
FIG. 5 is an end view of the wedge pin shown in FIG. 2.

FIG. 5 is an end view of the wedge pin shown in FIG. 2. The following should be viewed in light of FIGS. 2 through 5. Unless stated otherwise, the reference axis for the terminology shown in FIG. 1 is axis of rotation AR for wedge clutch 100. Wedge clutch 100 includes: hub 102; hub 104; outer ring 106 located radially outward of hubs 102 and 104; wedge plate 108 radially disposed between hub 102 and outer ring 106; wedge plate 110 radially disposed between hub 104 and outer ring 106; and wedge pin 112. Pin 112 includes shaft 114 and actuation ramp 116 non-rotatably connected to shaft 114. By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

In an example embodiment, to transition to a connect mode, for example from a disconnect mode described below, in which hubs 102 and 104 are non-rotatably connected to outer ring 106: wedge pin 112 is arranged to rotate in rotational direction RD1 about axis of rotation ARW for pin 112; and ramp 116 is arranged to slide along hubs 102 and 104 to displace hubs 102 and 104 away from each other. For example, ramp 116 exerts forces F1 and F2 on hubs 102 and 104, respectively, in directions AD2 and AD1, respectively, parallel to axis AR. In an embodiment, axis ARW is parallel to axis of rotation AR for clutch 100. Rotation of pin 112 in direction RD1 is based upon the spiral configuration (discussed below) of pin 112. It should be understood that the spiral configuration can be reversed such that pin 112 rotates in direction RD2, opposite direction RD1, to transition to the connect mode.

To transition to a disconnect mode, for example from the connect mode, in which the hubs 102 and 104 are rotatable with respect to outer ring 106, wedge pin 112 is arranged to: rotate in rotational direction RD2, opposite rotational direction RD1 to reduce axial distance 117 between hubs 102 and 104. The rotation of ramp 116 in direction RD2 also relieves forces F1 and F2 displacing hubs away from each other. As further described below, relieving forces F1 and F2 enables hubs 102 and 104 to move toward each other as shown in FIG. 2. Rotation of pin 112 in direction RD2 is based upon the spiral configuration (discussed below) of pin 112. It should be understood that the spiral configuration can be reversed such that pin 112 rotates in direction RD1 to transition to the disconnect mode.

Actuation ramp 116 includes: using axis of rotation ARW as a reference axis for the terminology discussed for FIG. 1, radially outer surface 118; surface 120 connecting radially outer surface 118 and shaft 114; and surface 122 connecting radially outer surface 118 and shaft 114. To transition between the connect and disconnect modes, surfaces 120 and 122 are arranged to slide along hubs 102 and 104. For the connect mode, surfaces 120 and 122 are in contact with hubs 102 and 104 to exert forces F1 and F2. In an example embodiment, surfaces 120 and 122 taper axially toward each other from circumferential end 124 of ramp 116 to circumferential end 126 of actuation ramp 116, that is, surfaces 120 and 122 taper radially outward toward each other. Stated otherwise, axial extent 128, parallel to axis ARW, of surface 118 decreases going from end 124 to end 126. In an example embodiment, radial distance 129 from axis ARW to surface 118 is constant. It should be understood that if pin 112 rotates in direction RD2 to transition to the connect mode, the positions of ends 124 and 126 would be circumferentially reversed.

Figure 6:
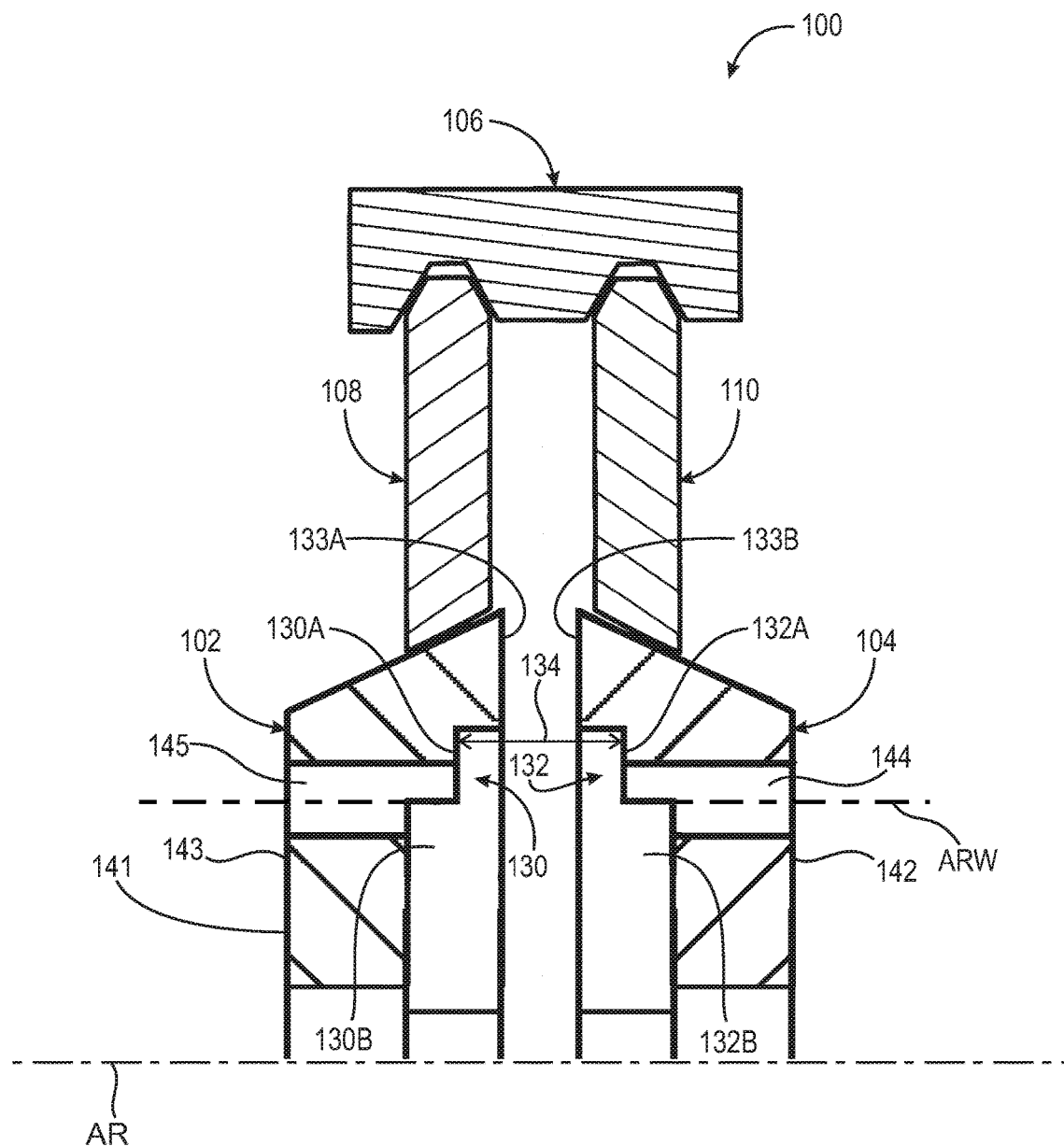
FIG. 6 is the partial cross-sectional view of FIG. 3 with a wedge pin and actuation plate removed.

FIG. 6 is the partial cross-sectional view of FIG. 3 with wedge pin 112 and an actuation plate removed.

Figure 7:
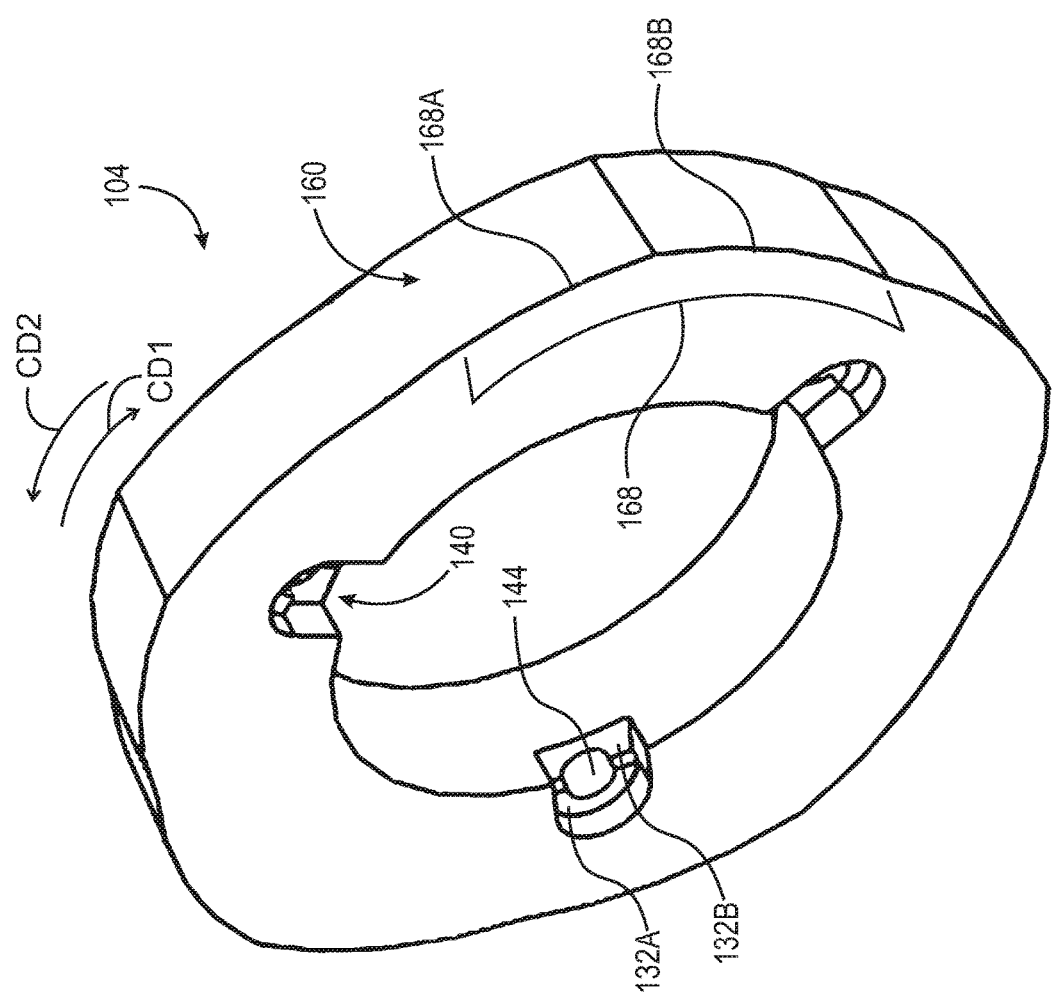
FIG. 7 is a front perspective view of the right-hand hub shown in FIG. 2.

FIG. 7 is a front perspective view of hub 104 shown in FIG. 2.

Figure 8:
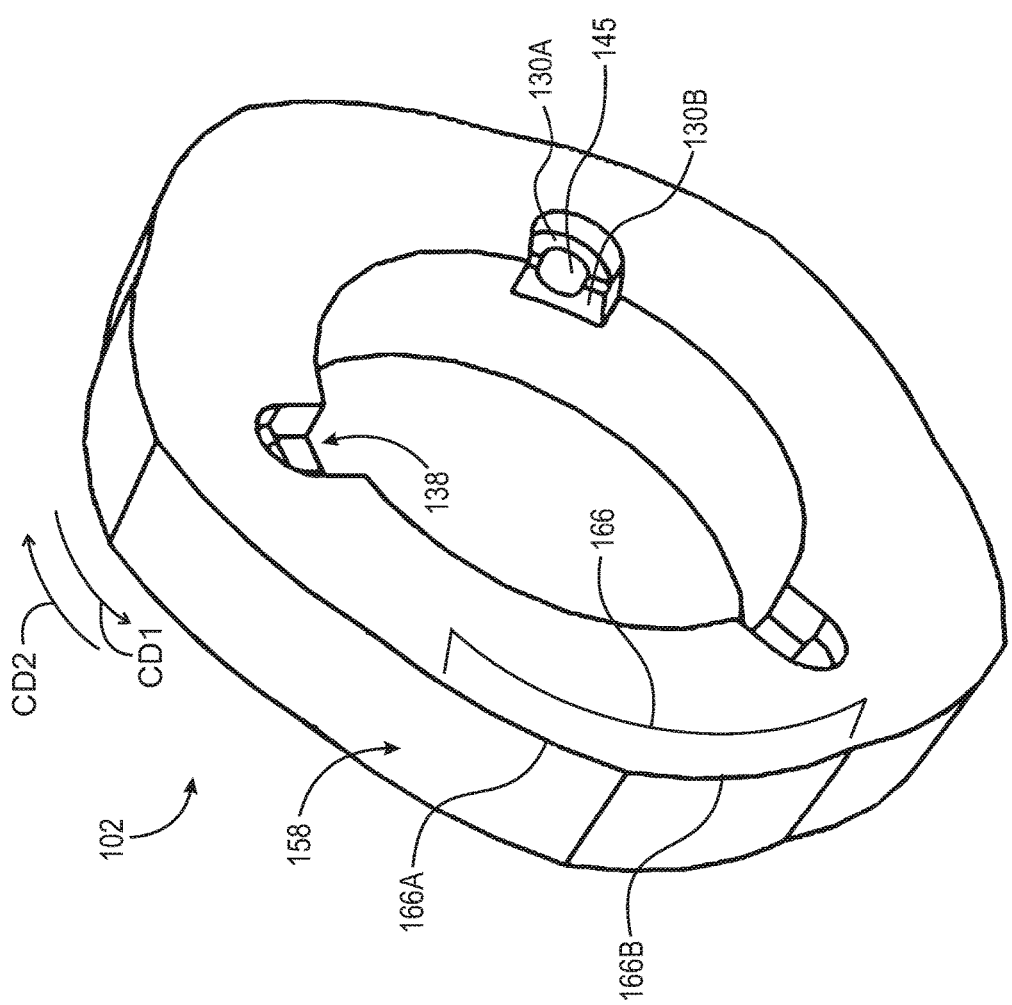
FIG. 8 is a back perspective view of the left-hand hub shown in FIG. 2.

FIG. 8 is a back perspective view of hub 102 shown in FIG. 2.

Figure 9:
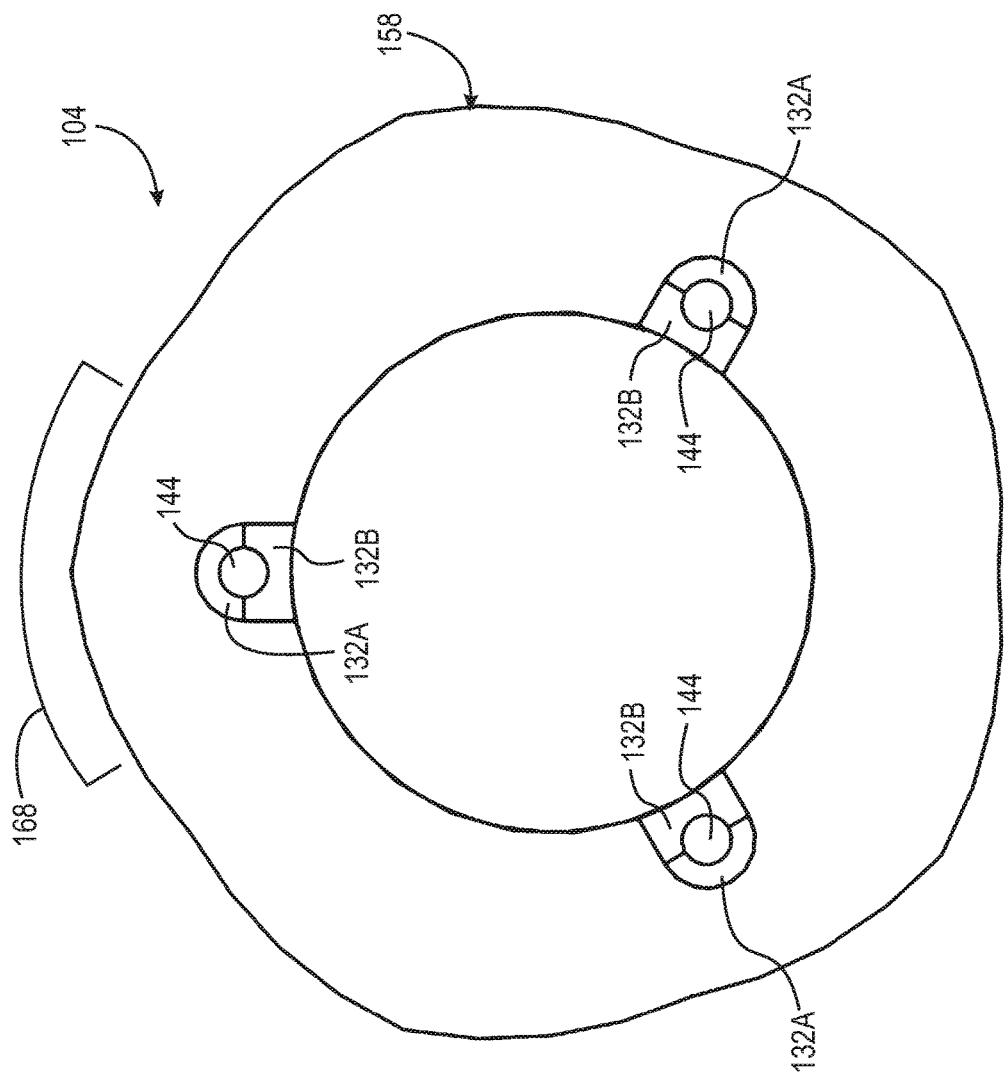
FIG. 9 is a front view of the right-hand hub shown in FIG. 2.

FIG. 9 is a front view of the hub 104 shown in FIG. 2.

Figure 10:
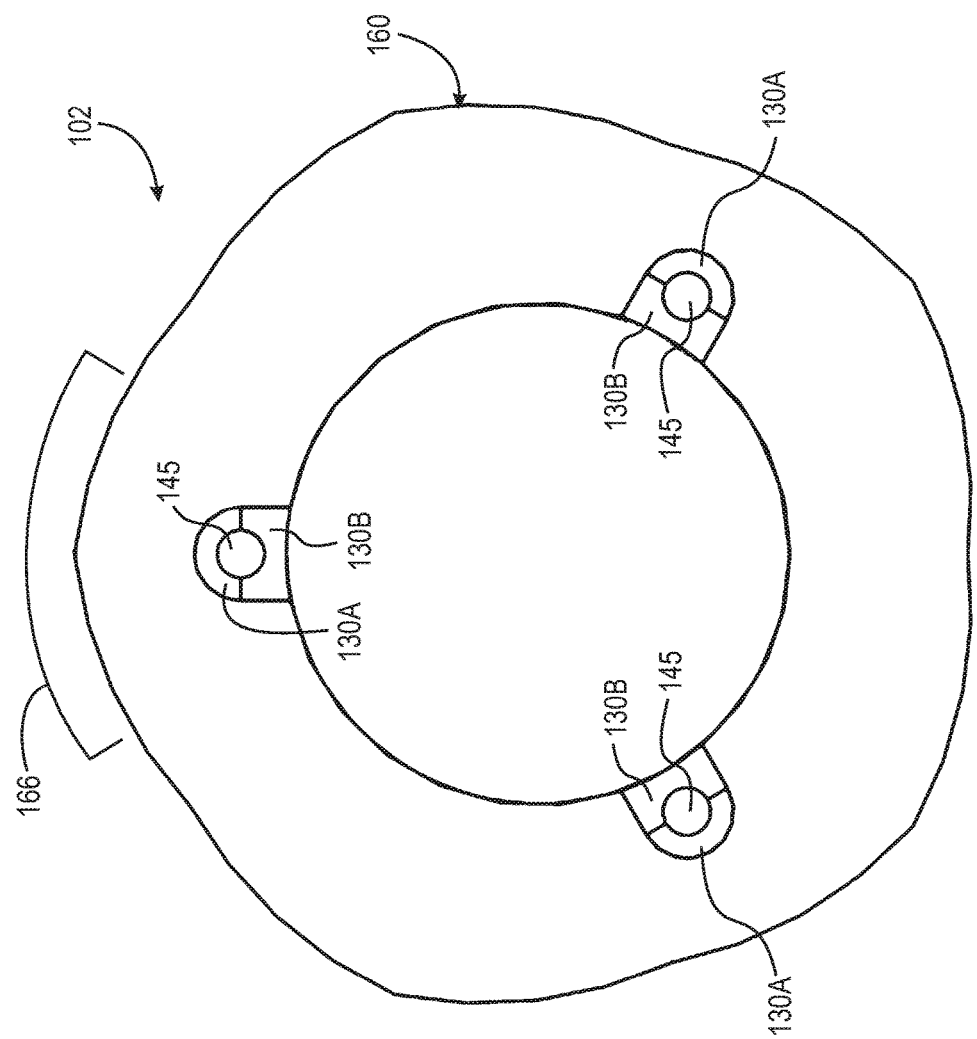
FIG. 10 is a back view of the left-hand hub shown in FIG. 2.

FIG. 10 is a back view of hub 102 shown in FIG. 2. The following should be viewed in light of FIGS. 2 through 10. Hub 102 includes at least one surface 130 disposed at least partially in radial direction RD orthogonal to axis of rotation AR, and hub 104 includes at least one surface 132 disposed at least partially in radial direction RD. For the connect and disconnect modes, surfaces 120 and 122 are arranged to slide along surfaces 130 and 132. In an example embodiment: surface 130 includes surfaces 130A and 130B disposed at least partially in radial direction RD; and surface 132 includes surfaces 132A and 132B disposed at least partially in radial direction RD. Surfaces 130B and 132B, respectively, are radially inward surfaces 130A and 132A, respectively. To transition between the disconnect mode and the connect mode, surfaces 120 and 122 are arranged to slide along the surfaces 130A, 130B, 132A and 132B. In an example embodiment, hub 102 includes three sets of surfaces 130A and 130B and hub 104 includes three sets of surfaces 132A and 132B.

In the connect mode, surfaces 120 and 122 are in contact with: one or both of surfaces 130A and 130B; and one or both of surfaces 132A and 132B. In an example embodiment, in the disconnect mode, surfaces 120 and 122 are in contact with: one or both of surfaces 130A and 130B; and one or both of surfaces 132A and 132B. In an example embodiment, surfaces 133A and 133B of hubs 102 and 104, respectively, are in contact.

In the connect mode: surfaces 130A and 132A are separated by distance 134 in axial direction AD1; and, surfaces 130B and 132B are separated by distance 136 in axial direction AD1. Distance 136 is greater than distance 134.

Hub 102 include cavity 138 facing axial direction AD1. Hub 104 include cavity 140 facing axial direction AD2. At least a portion of pin 112 is located in cavities 138 and 140. For example, at least a portion of ramp 116 is located in cavities 138 and 140. Hub 104 includes radial surface 142 facing direction AD1 and channel 144 connecting cavity 140 and radial surface 142. Shaft 114 passes through channel 144. In an example embodiment, hub 104 includes three channels 144. Hub 102 includes radial surface 141 facing direction AD2 and channel 145 connecting cavity 138 and radial surface 141. A portion of shaft 114 is located in channel 145. In an example embodiment, hub 102 includes three channels 145.

In an example embodiment: clutch 100 includes actuation plate 146 including opening 148 and shaft 114 includes spiral portion 150 passing through opening 148. Actuation plate 146 is displaceable in axial direction AD2 to rotate shaft 114 in rotational direction RD1. Actuation plate 146 is displaceable in axial direction AD1 to rotate shaft 114 in rotational direction RD2. To transition between the disconnect mode and the connect mode, plate 146 is arranged to rotate shaft 114. In an example embodiment, clutch 100 includes actuator 154 arranged to displace actuation plate 146 in axial directions AD1 and AD2. In an example embodiment, wedge pin 112 is in a same axial position, with respect to outer ring 106, in both the connect and disconnect modes. For example, line 156 in radial direction RD passes through point P1 on axis AR, point P2 on ramp 116, and point P3 on ring 106 in both the connect and disconnect modes. Displacement of plate 146 in axial directions AD1 and AD2 as noted above assumes pin 112 rotates in direction RD1 to transition to the connect mode. It should be understood that the if pin 112 rotates in direction RD2 to transition to the connect mode, plate 146 displaces in directions AD1 and AD2 to transition to the connect and disconnect modes, respectively. In an example embodiment (not shown), pin 112 extends through channel 145 in hub 102 so that ramp 116 is between hubs 102 and 104, hub 102 is between plate 146 and hub 104, pin 112 extends through plate 146, and a portion of pin 112 is located in channel 144.

Figure 11:
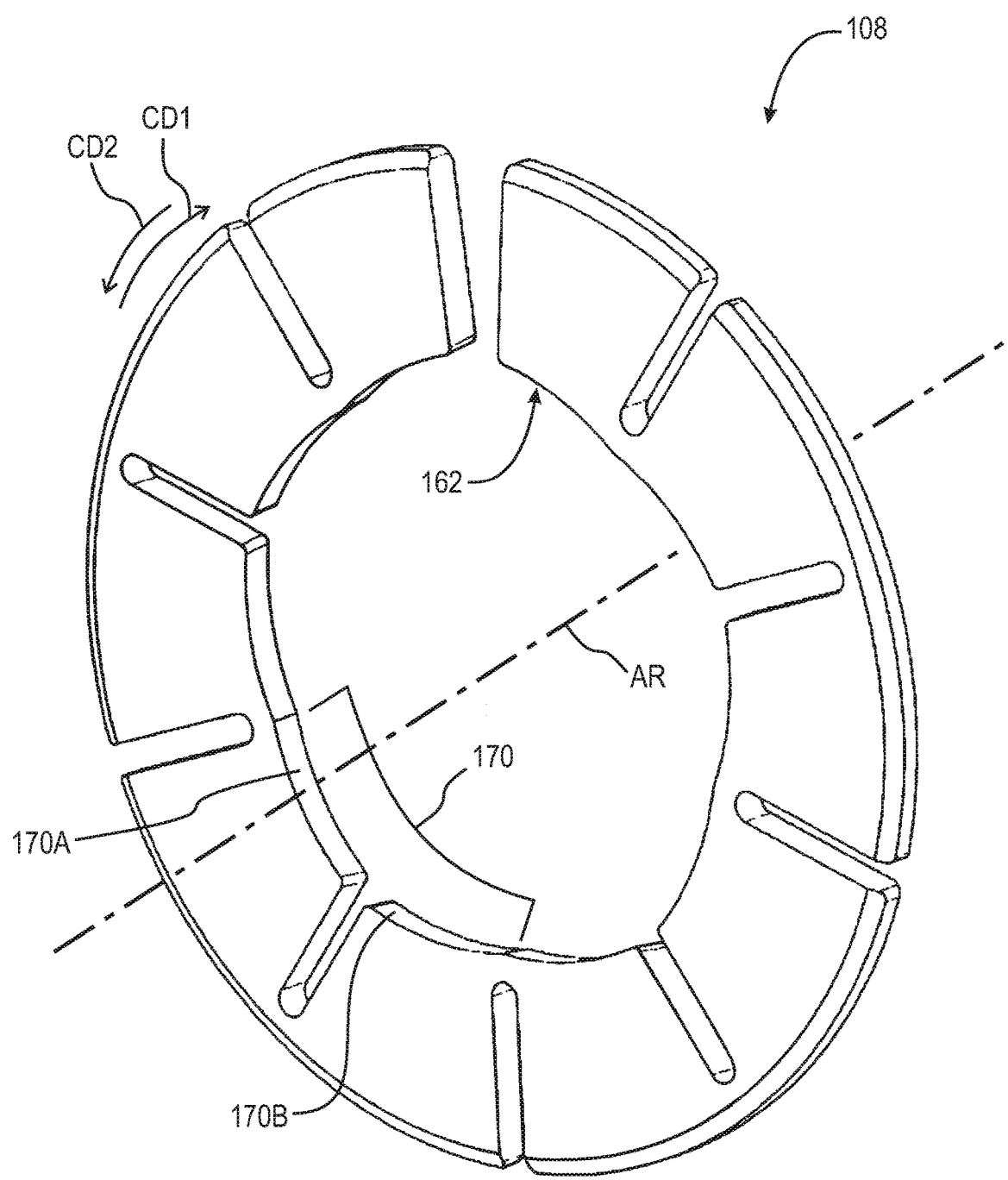
FIG. 11 is a front perspective view of the left-hand wedge plate shown in FIG. 2.

FIG. 11 is a front perspective view of wedge plate 108 shown in FIG. 2.

Figure 12:
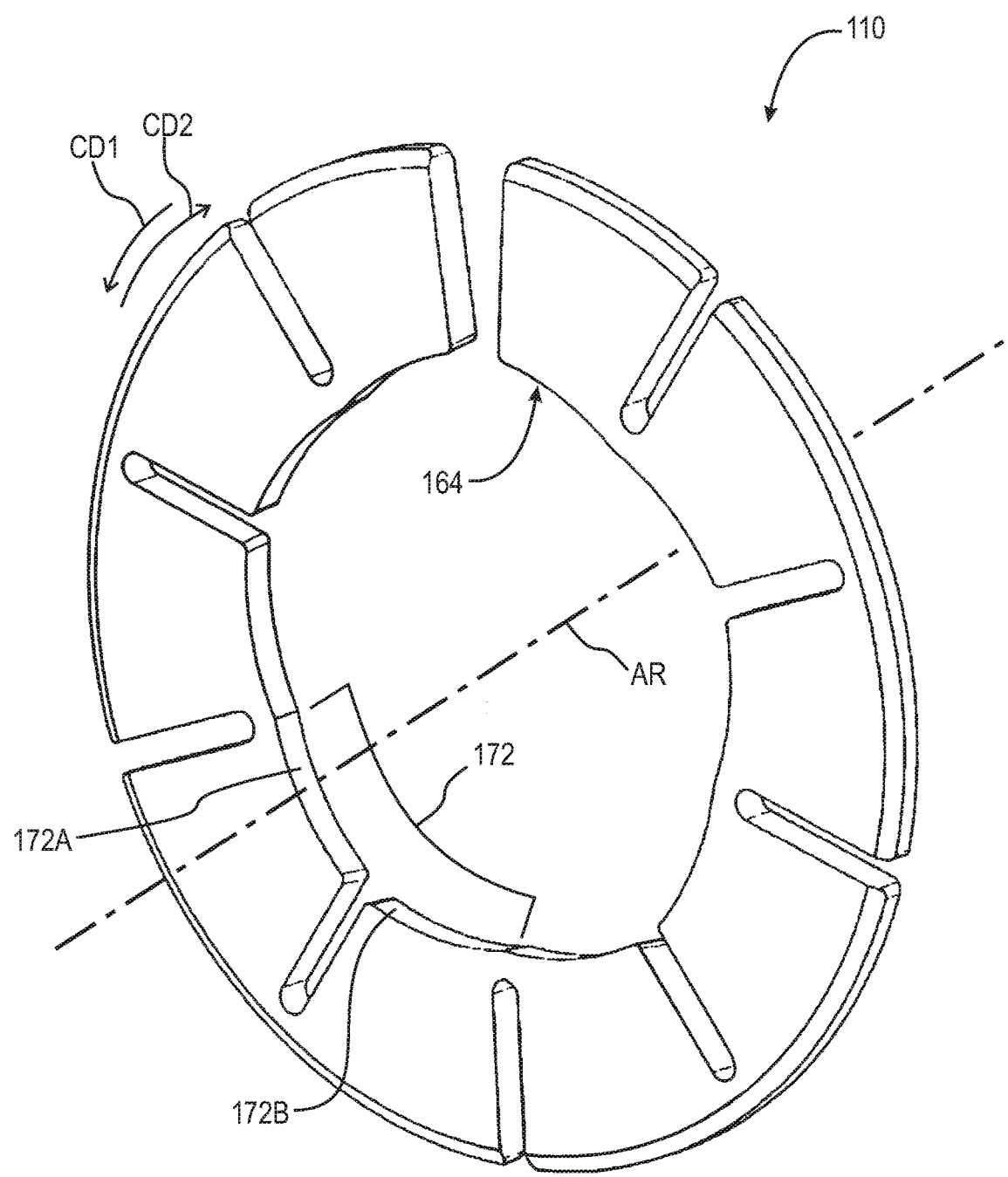
FIG. 12 is a back perspective view of the right-hand wedge plate shown in FIG. 2.

FIG. 12 is a back perspective view of wedge plate 110 shown in FIG. 2. The following should be viewed in light of FIGS. 2 through 12. Hub 102 includes radially outer surface 158 sloping radially outward toward hub 104. Hub 104 includes radially outer surface 160 sloping radially outward toward hub 102. Wedge plate 108 includes radially inner surface 162 sloping radially outward toward wedge plate 110. Wedge plate 110 includes radially inner surface 164 sloping radially outward toward wedge plate 108. For the connect mode, wedge pin 112 is arranged to hubs 102 and 104 in axial directions, AD2 and AD1, respectively, to brings surfaces 158 and 162 into contact and to bring surfaces 160 and 164 into contact.

In an example embodiment: surface 158 includes ramps, for example ramp pairs 166; surface 160 includes ramps, for example ramp pairs 168; surface 162 includes ramps, for example ramp pairs 170; and surface 164 includes ramps, for example ramp pairs 172. For the connect mode, ramp pairs 170 and 172 are arranged to slide radially outwardly along ramp pairs 166 and 168, respectively, in circumferential direction CD1 or circumferential direction CD2, opposite circumferential direction CD1. As further described below, ramps 166 and 170 are engagable and ramps 168 and 172 are engagable.

Each ramp pair 166 includes ramp 166A extending radially outward in circumferential direction CD1 and ramp 166B extending radially outward in circumferential direction CD2. Each ramp pair 168 includes ramp 168A extending radially outward in circumferential direction CD1 and ramp 168B extending radially outward in circumferential direction CD2. Each ramp pair 170 includes ramp 170A extending radially outward in circumferential direction CD1 and ramp 170B extending radially outward in circumferential direction CD2. Each ramp pair 172 includes ramp 172A extending radially outward in circumferential direction CD1 and ramp 172B extending radially outward in circumferential direction CD2. Each ramp 166A is engagable with a respective ramp 170A. Each ramp 166B is engagable with a respective ramp 170B. Each ramp 168A is engagable with a respective ramp 172A. Each ramp 168B is engagable with a respective ramp 172B.

Figure 13:
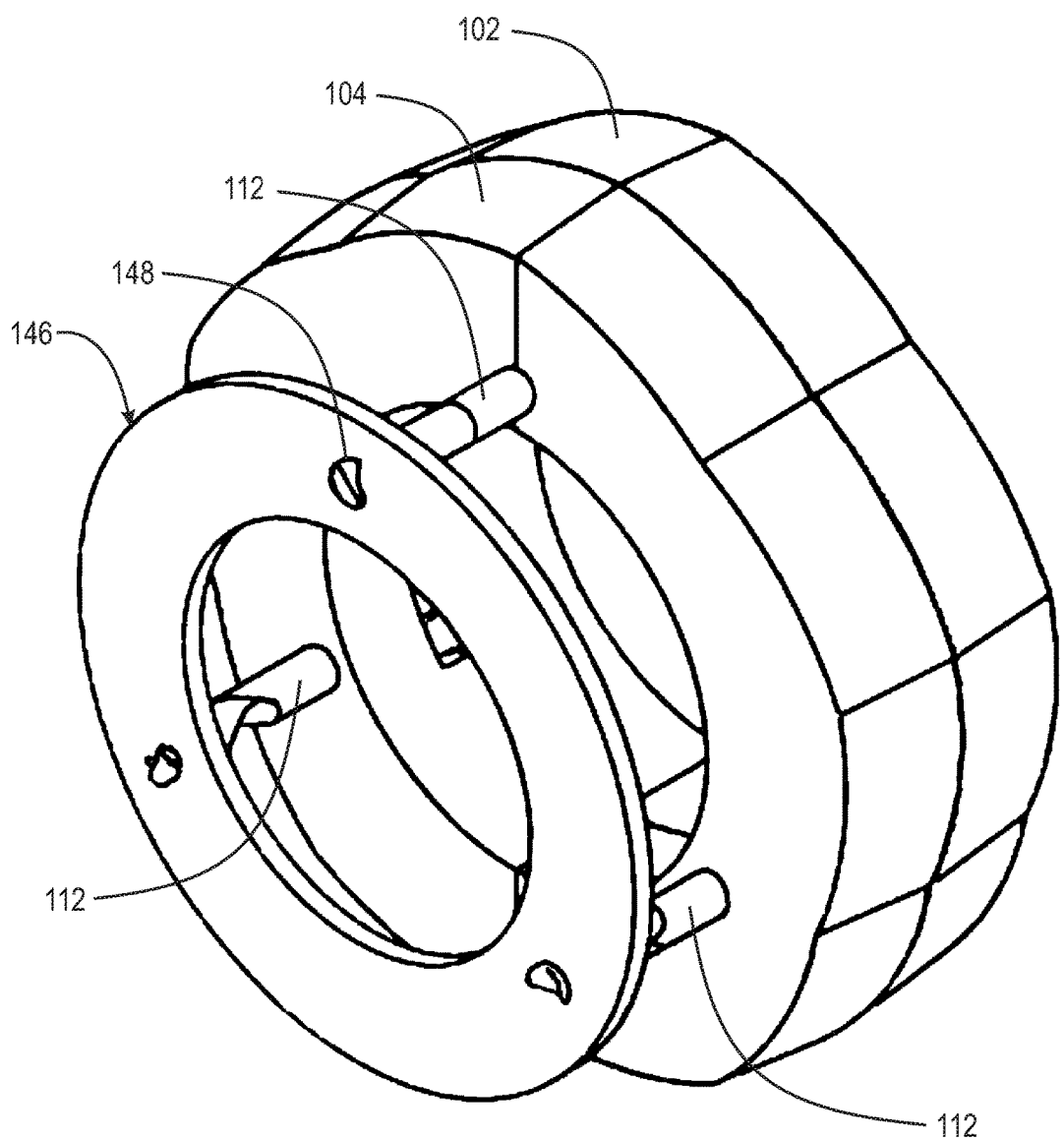
FIG. 13 is a back perspective view of the hubs shown in FIGS. 9 and 10 including an actuation plate and multiple wedge pins.

FIG. 13 is a back perspective view of hubs 102 and 104 shown in FIGS. 9 and 10 including actuation plate 146 and multiple wedge pins 112.

Figure 14:
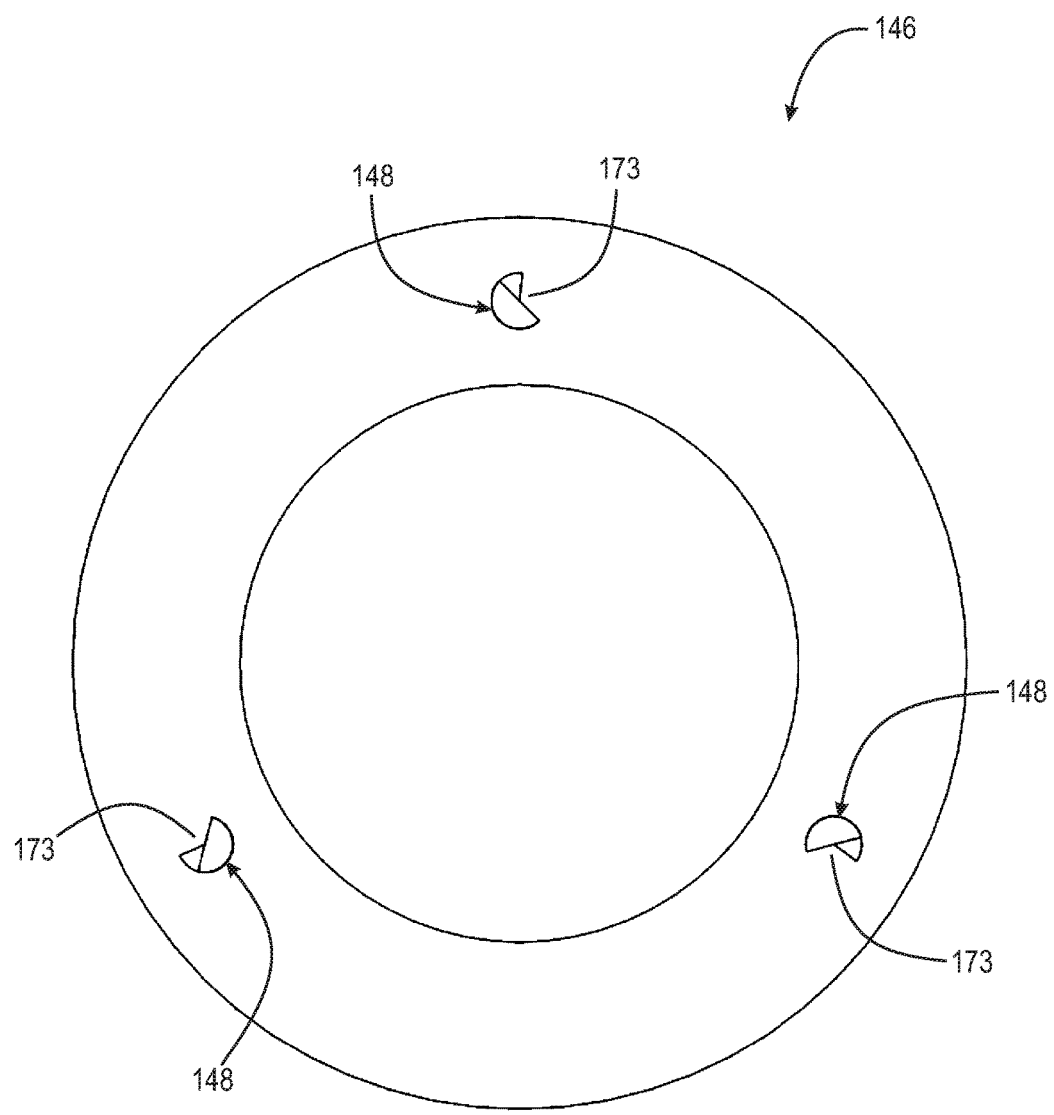
FIG. 14 is a back view of the actuation plate shown in FIG. 13.
Figure 15:
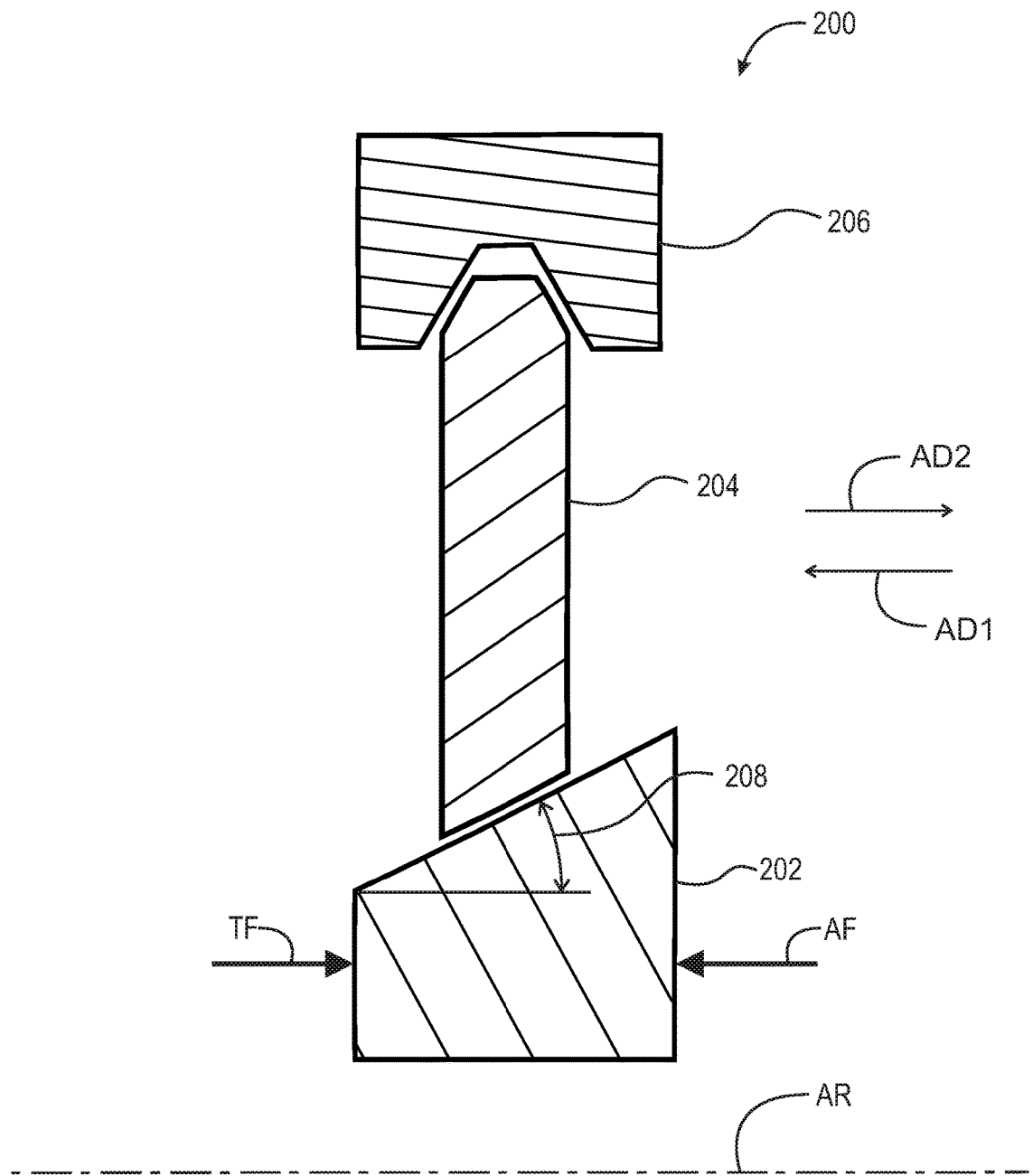
FIG. 15 is a partial cross-sectional view of a prior art wedge clutch.

FIG. 14 is a back view of actuation plate 146 shown in FIG. 13. The following should be viewed in light of FIGS. 2 through 14. In an example embodiment, clutch 100 includes three wedge pins 112 and plate 146 includes three openings 148. The discussion for FIGS. 2 through 10 is applicable to FIGS. 13 and 14. In an example embodiment, each opening 148 in plate 146 includes protrusion 173 engaged with, for example in contact with, a respective spiral portion 150 passing through each opening 148. As plate 146 is displaced in direction AD2, protrusions 173, which are fixed with respect to pins 112, displace through spiral portions 150, forcing pins 112 to rotate in direction RD1. As plate 146 is displaced in direction AD1, protrusions 173 displace through spiral portions 150, forcing pins 112 to rotate in direction RD2.

The following provides further detail regarding the structure and function of wedge clutch 100. Note that torque can be applied to: hubs 102 and 104 for transmission to ring 106; or ring 106 for transmission to hubs 102 and 104. For example, to initiate the connected mode as shown in FIG. 3, hubs 102 and 104 are axially displaced away from each other by ramp 116 and torque is applied to hubs 102 and 104 in direction CD1. As hubs 102 and 104 axially displace away from each other, wedge plates 108 and 110 slide radially outwardly along surfaces 114 and 116, respectively. Outer circumferential surfaces 174 and 176 of plates 108 and 110, respectively, frictionally engage inner circumferential surface 178 of ring 106. Hubs 102 and 104 and wedge plates 108 and 110 are rotating relative to ring 106 in direction CD1. Therefore, the frictional engagement of plates 108 and 110 with ring 106 causes plates 108 and 110 to rotate with respect to hubs 102 and 104, respectively, causing ramps 170A and 172A to slide radially outwardly (slide up or climb) along ramps 166A and 168A, respectively, which in turn causes wedge plates 108 and 110 to expand radially outward. The radially outward expansion of wedge plates 108 and 110 causes wedge plates 108 and 110 to non-rotatably connect to ring 106 and to hubs 102 and 104.

In an example embodiment, surface 178 includes chamfers 180 and wedge plates 108 and 110 includes chamfered radially outer portions 182 and 184, respectively.

To initiate the disconnect mode shown in FIG. 2, wedge key 112 is rotated in direction RD2 and wedges hubs 102 and 104 are axially displaced toward each other. For example, when the compressive force on wedge plates 108 and 110, associated with the connected mode, is released, wedge plates 108 and 110 slide down surfaces 158 and 160, respectively, creating gaps 186 and 188, respectively. Since there is little or no contact between wedge plates 108 and 110 and ring 106, ring 106 and hubs 102 and 104 are able to rotate independently of each other.

The discussion for torque applied in direction CD1 is applicable to torque applied in direction CD2. For example, to initiate the connected mode as shown in FIG. 3, hubs 102 and 104 are axially displaced away from each other by ramp 116 and torque is applied to hubs 102 and 104 in direction CD2. As hubs 102 and 104 axially displace away from each other, wedge plates 108 and 110 slide radially outwardly along surfaces 114 and 116, respectively. Outer circumferential surfaces 174 and 176 of plates 108 and 110, respectively, frictionally engage inner circumferential surface 178 of ring 106. Hubs 102 and 104 and wedge plates 108 and 110 are rotating relative to ring 106 in direction CD2. Therefore, the frictional engagement of plates 108 and 110 with ring 106 causes plates 108 and 110 to rotate with respect to hubs 102 and 104, respectively, causing ramps 170B and 172B to slide radially outwardly (slide up or climb) along ramps 166B and 168B, respectively, which in turn causes wedge plates 108 and 110 to expand radially outward. The radially outward expansion of wedge plates 108 and 110 causes wedge plates 108 and 110 to non-rotatably connect to ring 106 and to hubs 102 and 104. The discussion for the disconnect mode and torque in direction CD1 is applicable to the disconnect mode for torque in direction CD2.

Note that the above discussion regarding application of torque through hubs 102 and 104 is applicable to application of torque through ring 106.

Advantageously, pins 112 serve at least two purposes: to create an initial movement of hubs 102 and 104 to synchronize the respective speeds of outer ring 106 and plates 108 and 110; and to lock hubs 102 and 104 in a geometrical defined position to each other during load transmission (connect mode). Locking hubs 102 and 104 has two benefits. First, the high thrust loads generated at the contact of conic surfaces 158 and 162 and at the contact of conic surfaces 160 and 164 cancel each other. Second, hubs 102 and 104 are forced out, by pins 112, in opposite directions AD2 and AD1, respectively, due to the geometrically defined positioning of hubs 102 and 104, such that hub movements associated with the connect mode cancel each other to prevent unintended transition from the connect mode to the disconnect mode. Therefore, there is no unintentional and undesirable opening of clutch 100 during the connect mode.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
a first hub;
a second hub;
an outer ring located radially outward of the first and second hubs;
a first wedge plate radially disposed between the first hub and the outer ring;
a second wedge plate radially disposed between the second hub and the outer ring; and,
a wedge pin including an actuation ramp axially disposed between the first and second hubs, wherein:
to transition to a connect mode, in which the first and second hubs are non-rotatably connected to the outer ring:
the wedge pin is arranged to rotate in a first rotational direction about an axis of rotation for the wedge pin; and,
the actuation ramp is arranged to displace the first and second hubs away from each other; and,
to transition to a disconnect mode, in which the first and second hubs are rotatable with respect to the outer ring, the wedge pin is arranged to rotate in a second rotational direction, opposite the first rotational direction to reduce an axial distance between the first and second hubs.

2. The wedge clutch of claim 1, wherein the axis of rotation for the wedge pin is parallel to an axis of rotation for the wedge clutch.

3. The wedge clutch of claim 1, wherein:
the wedge pin includes a shaft;
the actuation ramp is non-rotatably connected to the shaft; and,
to transition between the connect and disconnect modes, the actuation ramp is arranged to slide along the first and second hubs.

4. The wedge clutch of claim 3, wherein:
the actuation ramp includes:
using the axis of rotation for the wedge pin as a reference axis, a radially outer surface;
a first surface connecting the radially outer surface and the shaft; and,
a second surface connecting the radially outer surface and the shaft; and,
to transition between the connect and disconnect modes, the first and second surfaces are arranged to slide along the first and second hubs.

5. The wedge clutch of claim 4, wherein:
the first and second surfaces taper axially toward each other from a first circumferential end of the actuation ramp to a second circumferential end of the actuation ramp;
the first hub includes at least one surface disposed at least partially in a radial direction orthogonal to an axis of rotation for the wedge clutch;
the second hub includes at least one surface disposed at least partially in the radial direction; and,
in the connect mode, the first and second surfaces are in contact with the at least one surface for the first hub and the at least one surface for the second hub.

6. The wedge clutch of claim 5, wherein:
the at least one surface for the second hub includes a first surface disposed at least partially in the radial direction and a second surface disposed at least partially in the radial direction and located radially inward of the first surface disposed at least partially in the radial direction;
the at least one surface for the second hub includes a third surface disposed at least partially in the radial direction and a fourth surface disposed at least partially in the radial direction and located radially inward of the third surface;
in the connect mode, the first circumferential end of the actuation ramp is in contact with the first and third surfaces; and,
in the disconnect mode, the first and second surfaces are in contact with:
the first and third surfaces; or,
the second and fourth surfaces.

7. The wedge clutch of claim 6, wherein:
in the connect mode, the second and fourth surfaces are separated by a first distance in an axial direction parallel to an axis of rotation for the wedge plate; and,
in the disconnect mode, the second and fourth surfaces are separated, in the axial direction, by a second distance less than the first distance.

8. The wedge clutch of claim 1, wherein:
the actuation ramp includes, using the axis of rotation for the wedge pin as a reference axis, a radially outer surface; and,
a radial distance, orthogonal to the axis of rotation for the wedge pin, of the radially outer surface from the axis of rotation for the wedge pin, is constant.

9. The wedge clutch of claim 1, wherein:
the first hub includes a cavity facing in a first axial direction parallel to an axis of rotation for the wedge clutch;
the second hub includes a cavity facing in a second axial direction, opposite the first axial direction; and,
at least a portion of the actuation ramp is located in the respective cavities for the first and second hubs.

10. The wedge clutch of claim 9, wherein:
the wedge pin includes a shaft;
the actuation ramp is non-rotatably connected to the shaft;
the second hub includes:
a radial surface facing the first axial direction; and,
a channel connecting the cavity for the second hub with the radial surface for the second hub; and,
the shaft passes through the channel.

11. The wedge clutch of claim 1, further comprising:
an actuation plate including an opening, wherein:
the wedge pin includes a shaft with a spiral portion passing through the opening;
the actuation ramp is non-rotatably connected to the shaft;
the opening includes a protrusion in contact with the spiral portion for the shaft;
the actuation plate is displaceable in a first axial direction, parallel to the axis of rotation for the wedge pin, to rotate the shaft in the first rotational direction; and,
the actuation plate is displaceable in a second axial direction, opposite the first axial direction, to rotate the shaft in the second rotational direction.

12. The wedge clutch of claim 11, further comprising:
an actuator arranged to displace the actuation plate in the first and second axial directions.

13. The wedge clutch of claim 11, wherein:
to transition between the disconnect mode and the connect mode, the protrusion of the actuation plate is arranged to rotate the shaft.

14. The wedge clutch of claim 1, wherein the wedge pin is in a same axial position, with respect to the outer ring, in both the connect and disconnect modes.

15. The wedge clutch of claim 1, wherein:
the first hub includes a radially outer surface sloping radially outward toward the second hub;
the second hub includes a radially outer surface sloping radially outward toward the first hub;
the first wedge plate includes a radially inner surface sloping radially outward toward the second wedge plate;
the second wedge plate includes a radially inner surface sloping radially outward toward the first hub; and,
for the connect mode, the wedge pin is arranged to displace the first and second hubs in first and second opposite axial directions, respectively, to:
bring the radially outer surface of the first hub into contact with the radially inner surface of the first wedge plate; and,
bring the radially outer surface of the second hub into contact with the radially inner surface of the second wedge plate.

16. The wedge clutch of claim 15, wherein:
the radially outer surface of the first hub includes a first plurality of ramps;
the radially inner surface of the first wedge plate includes a second plurality of ramps engaged with the first plurality of ramps;
the radially outer surface of the second hub includes a third plurality of ramps;
the radially inner surface of the second wedge plate includes a fourth plurality of ramps engaged with the third plurality of ramps; and,
for the connect mode, the second and fourth pluralities of ramps are arranged to slide radially outwardly along the first and third pluralities of ramps, respectively, in a first circumferential direction or in a second circumferential direction, opposite the first circumferential direction.

17. A wedge clutch, comprising:
a first hub;
a second hub;
an outer ring located radially outward of the first and second hubs;
a first wedge plate radially disposed between the first hub and the outer ring;
a second wedge plate radially disposed between the second hub and the outer ring; and,
a wedge pin including:
a shaft; and,
an actuation ramp non-rotatably connected to the shaft, the actuation ramp including:
using the axis of rotation for the wedge pin as a reference, a radially outer surface;
a first surface connecting the radially outer surface and the shaft; and,
a second surface connecting the radially outer surface and the shaft, wherein:
to transition to a connect mode, in which the first and second hubs are non-rotatably connected to the outer ring:
the wedge pin is arranged to rotate in a first rotational direction about the axis of rotation for the wedge pin; and,
the first and second surfaces are arranged to displace the first and second hubs axially away from each other; and,
to transition to a disconnect mode, in which the first and second hubs are rotatable with respect to the outer ring, the wedge pin is arranged to rotate in a second rotational direction, opposite the first rotational direction, to reduce an axial space between the first and second hubs.

18. The wedge clutch of claim 17, further comprising:
an actuation plate with an opening including a protrusion, wherein:
the shaft includes a spiral surface passing through the opening and in contact with the protrusion;
the actuation plate is displaceable:
in a first axial direction, parallel to the axis of rotation for the shaft, to rotate the shaft in the first rotational direction; and,
in a second axial direction, opposite the first axial direction, to rotate the shaft in the second rotational direction;
an extent of the radially outer surface, in the first axial direction, decreases from a first circumferential end of the actuation ramp to a second circumferential end of the actuation ramp;
the first hub includes a third surface disposed at least partially in a radial direction orthogonal to an axis of rotation for the wedge clutch;
the second hub includes a fourth surface disposed at least partially in the radial direction; and,
for the connect mode:
the first and second surfaces are in contact with the third and fourth surfaces, respectively; and,
the first circumferential end is radially inward of the second circumferential end.

19. A wedge clutch, comprising:
a first hub including a first cavity and a first surface disposed at least partially in a radial direction orthogonal to an axis of rotation for the wedge clutch;
a second hub including a second cavity and a second surface disposed at least partially in the radial direction;
an outer ring located radially outward of the first and second hubs;
a first wedge plate radially disposed between the first hub and the outer ring;
a second wedge plate radially disposed between the second hub and the outer ring; and,
a wedge pin including:
a shaft; and,
an actuation ramp non-rotatably connected to the shaft, the actuation ramp including:
a portion disposed in the first and second cavities;
a first circumferential end having a first extent in an axial direction parallel to an axis of rotation for the wedge pin;
a second circumferential end having a second extent in the axial direction less than the first extent;
using the axis of rotation for the wedge pin as a reference axis, a radially outer surface;
a third surface connecting the first and second circumferential ends; and,
a fourth surface connecting the first and second circumferential ends, wherein:
to transition to a connect mode, in which the first and second hubs are non-rotatably connected to the outer ring:
the wedge pin is arranged to rotate in a first rotational direction about the axis of rotation for the wedge pin; and, the third and fourth surfaces are arranged to displace the first and second hubs axially away from each other;

in the connect mode, the second circumferential end is radially between the axis of rotation for the wedge pin and an axis of rotation for the wedge clutch;

to transition to a disconnect mode, in which the first and second hubs are rotatable with respect to the outer ring, the wedge pin is arranged to rotate in a second rotational direction, opposite the first rotational direction; and, in the disconnect mode, the first circumferential end is radially between the axis of rotation for the wedge pin and the axis of rotation for the wedge clutch.

20. The wedge clutch of claim 19, further comprising:

an actuation plate with an opening, wherein:

the shaft passes through the opening;

the actuation plate is displaceable:
- in a first axial direction, parallel to the axis of rotation for the shaft, to rotate the shaft in the first rotational direction; and,
- in a second axial direction, opposite the first axial direction, to rotate the shaft in the second rotational direction;

the first hub includes a fifth surface disposed at least partially in the radial direction;

the second hub includes a sixth surface disposed at least partially in the radial direction; and, for the connect mode, the second and third surfaces are in contact with the fifth and sixth surfaces, respectively.

* * * * *